Figure 1:
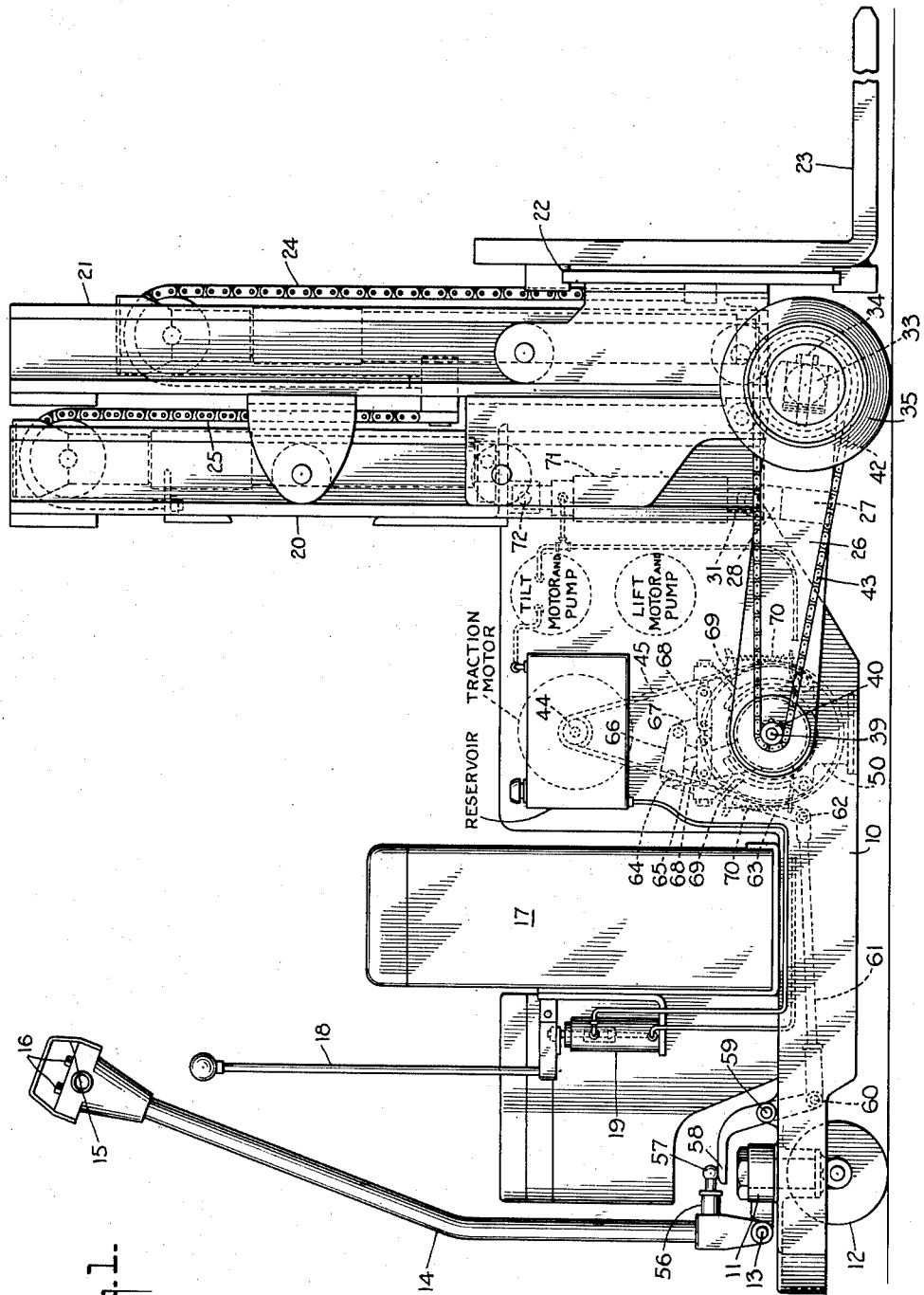

Dec. 30, 1952    H. J. FRAMHEIN    2,623,653
TILTING AND TRACTION ASSEMBLY FOR INDUSTRIAL TRUCKS
Filed Aug. 4, 1948    3 Sheets-Sheet 1

INVENTOR
H. J. Framhein
BY
A. H. Golden
ATTORNEY

Dec. 30, 1952   H. J. FRAMHEIN   2,623,653
TILTING AND TRACTION ASSEMBLY FOR INDUSTRIAL TRUCKS
Filed Aug. 4, 1948   3 Sheets-Sheet 2

INVENTOR
H. J. Framhein
BY
ATTORNEY

Dec. 30, 1952     H. J. FRAMHEIN     2,623,653
TILTING AND TRACTION ASSEMBLY FOR INDUSTRIAL TRUCKS
Filed Aug. 4, 1948     3 Sheets-Sheet 3

INVENTOR
H. J. Framhein
BY
ATTORNEY

Patented Dec. 30, 1952

2,623,653

UNITED STATES PATENT OFFICE 2,623,653

TILTING AND TRACTION ASSEMBLY FOR INDUSTRIAL TRUCKS

Herbert J. Framhein, Chicago, Ill., assignor to The Yale & Towne Manufacturing Company, Stamford, Conn., a corporation of Connecticut Application August 4, 1948, Serial No. 42,408

8 Claims. (Cl. 214—672)

This invention relates to an industrial truck of that type known as a motorized hand truck. Trucks of this class are formed usually with a steering head at one end that is manually rotated by a steering handle held by an operator. The truck is power driven and the operator controls the direction of movement of the truck and its speed of movement by means positioned on the steering handle. Trucks of the particular class are now manufactured equipped with load lifting mechanism that frequently takes the form of an elevating fork carriage moving on vertical uprights.

In trucks of the type utilizing vertically moving forks, it is highly desirable that the forks be tilted in order to better transport a load carried by the forks. It is customary in fork trucks to mount the uprights on which the forks move so that the uprights may be tilted about a pivot axis, and for contributing this tilting movement, power operated rack and pinions or power operated hydraulic rams may be utilized. The tilting movement of the forks and uprights takes place relatively to the main frame of the truck and about the pivot axis to which reference has been made. Where a truck of this type is driven by traction wheels mounted at that end of the truck opposite the end on which the uprights are positioned, no particular problem arises in designing and locating the lifting, tilting and traction mechanism of the truck. However, where the load is thus carried at that end of the truck opposite the end at which the traction wheels are located, the traction wheels are incapable of submitting full tractive effort. Therefore, it is apparent that tractive effort is best transmitted when the traction wheels are mounted under the load or very closely to the load. To mount under the uprights of a motorized hand truck a standard traction unit of the type used in heavy duty electric trucks, and to assemble a tilting unit to the same uprights, is not practicable because it would increase the price of the truck to the point where it would not be economically sound, even if room for the tilt assembly could be found. It is the purpose of my invention to contribute combined traction means and upright tilting means adapted especially for use in a motorized truck.

One feature of my invention whereby the contribution thereof results, resides in the utilization of a traction unit that is pivoted to the truck in such position that the wheels of the traction unit are in close relation to the point where the full load is applied to the truck and preferably under the vertical uprights of the truck on which the load carriage or forks move. As a further feature of this part of the invention, means are provided between the main frame of the truck and the traction unit to pivot the traction unit and main frame relatively to one another so as to raise one end of the truck relatively to the ground. This effects a pivotal movement of the uprights, when they are used in the truck, so as to tilt the load as is required.

As a further feature of my invention, the traction unit wheels are driven through power shafts displaced from the traction wheels. As a further feature of this part of the invention, the power shafts are mounted in the axis on which the traction unit is itself pivoted relatively to the main frame, and preferably these shafts are driven in differential relation so as to impart differential movement to the traction wheels. As a still further feature of this invention, the power shafts drive the traction wheels through chain and sprocket mechanism with one wheel rotating with one shaft while the other traction wheel rotates with the other power shaft.

A further feature of my invention resides in a novel form of brake coacting with a differential drive mechanism.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims to be granted me shall be of sufficient breadth to prevent the appropriation of my invention by those skilled in the art.

Figure 2:
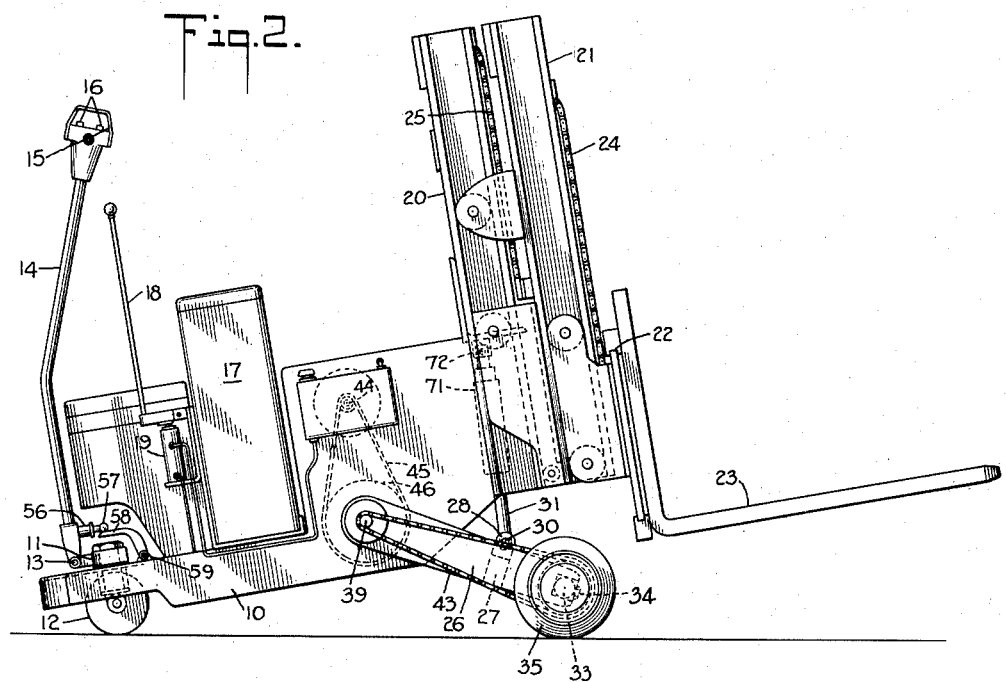
Figure 3:
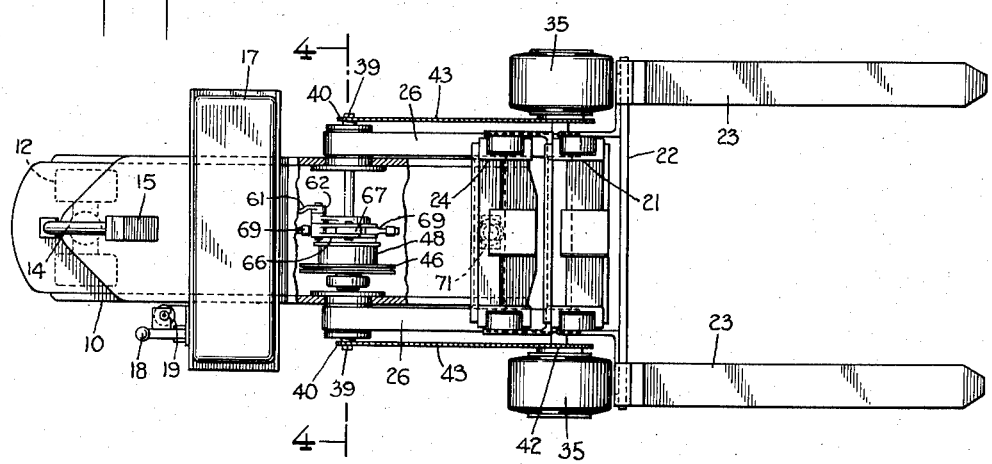
Figures 4, 5:
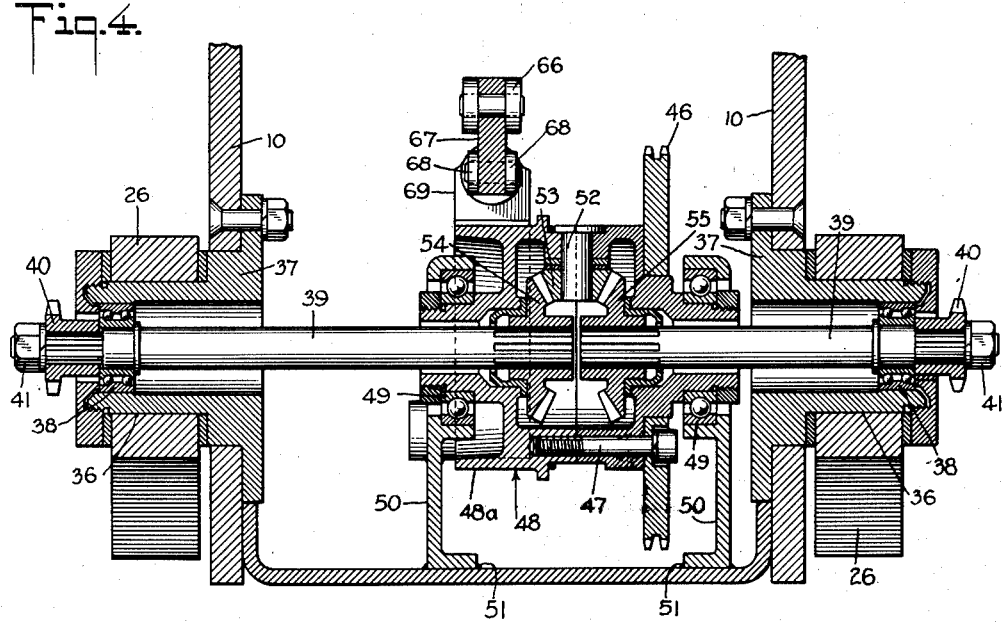

Referring now to the drawings, Fig. 1 is a side elevation of a truck showing my invention applied thereto. Fig. 2 shows the truck of Fig. 1 with the main frame tilted relatively to the traction unit. Fig. 3 is a view looking downwardly on the truck of Figs. 1 and 2. Fig. 4 is a section taken along lines 4—4 of Fig. 3. Fig. 5 is a perspective view of the traction unit frame.

Referring now more particularly to the drawings, reference numeral 10 indicates generally the main frame of a motorized hand truck of the general type well known in this art. At the forward end of the truck there is mounted a steering head 11 carrying a steering wheel 12 and rotatable relatively to the main frame 10. The steering head 11 has pivoted thereto at 13 a control and steering handle 14 adapted to be moved by an operator who will apply his hand to the part 15 thereof. Suitable switch buttons are located as shown at 16, preferably to control the several motors of the truck, these motors including a traction motor, a tilt motor, and a lift motor, all so designated in the drawings.

At 17 is shown a battery containing casing within which is mounted a usual type storage battery forming the source of electric power for my truck. Through the switch mechanism at 16 the circuits of the traction motor, the tilt motor, and the lift motor may be opened and closed through the battery as is well understood by those skilled in the art. A lever 18 operates valve mechanism at 19 to control the tilt motor and its pump for lowering the load as will later be set forth.

At that end of the main frame opposite the end on which the steering head 11 is mounted, there is shown secured a pair of primary uprights 20 on which a pair of secondary uprights 21 are adapted for vertical movement. A load carriage 22 formed with a pair of lift forks 23 is adapted for movement on the secondary uprights 21. For lifting the carriage and secondary uprights a pair of rams is utilized, one ram lifting the carriage 22 relatively to the secondary uprights 21 through a chain 24 while the secondary uprights 21 are, in turn, lifted by the second ram through the chain 25 relatively to the primary uprights 20.

In the constructions of the prior art, it is customary to mount the primary uprights 20 for pivotal movement relatively to the main frame 10, it being obvious that when the primary uprights 20 move pivotally relatively to the main frame 10, the secondary uprights 21 and the carriage 22 will also pivot so as to tilt a load carried by the forks 23. I depart from this construction of the prior art by welding or otherwise securing the primary uprights 20 to the main frame 10 to form an integral part thereof. Insofar as I have described my truck, except as to the fixing of the uprights, its construction is generally old and well known in the art, and for that reason I have not shown in greater detail the parts to which I have made reference. I shall now describe particularly that portion of the truck that is my contribution to the art, and which makes possible an efficient traction and tilting mechanism.

Referring now more particularly to Fig. 5, I show there the frame of the novel traction unit of my invention. This frame comprises side bars 26 held assembled as an integral unit by a cross bar 27 having a pair of brackets 28 bored at 29 for the cross shaft 30 of the piston 31 of a hydraulic ram best illustrated in Figs. 1 and 2, and to which reference will later be made. The extreme right hand ends of the side bars 26 are bifurcated for an axle 32 having wheel supporting shafts 33 at the ends thereof. Axle 32 is secured by suitable studs 34 in the bifurcated portions of the side bars 26 with the wheel supporting shafts 33 carrying opposed traction wheels 35.

The left ends of the side bars 26, as viewed in Fig. 5, are bored as at 36 so as to be mounted for pivotal movement relatively to the main frame 10. If reference is now made to Fig. 4, it will be noted there that the main frame 10 has secured at each side thereof a sleeve-like bearing member 37, each bearing member having a part thereof traversing a bore 36 of the side bar 26 and forming a bearing for said side bar. Each sleeve-like bearing member 37 supports on its inner periphery a ball bearing 38, and carried by each ball bearing 38 is a drive shaft 39. It may therefore be said that the drive shafts 39 are rotatable relatively to the main frame 10 in the same axis as that on which the traction unit frame 26 itself pivots relatively to the main frame.

Each drive shaft 39 has splined thereon a sprocket 40 held in place by a suitable nut 41. Each of the traction wheels 35 has secured thereto a sprocket 42, and a chain 43 extends over each pair of sprockets 40, 42 so that each drive shaft rotates one of the traction wheels 35. The drive shafts 39 are adapted to be rotated by the traction motor to which reference has already been made, and preferably the said drive shafts are in differential relation to one another and the traction motor for reasons that will be understood by those skilled in the art.

Referring now to Figs. 1 and 4, the traction motor is shown equipped with a sprocket 44 adapted to actuate a chain 45. Chain 45 passes over a sprocket 46 that is secured through a series of bolts 47 to a rotating differential housing 48. Differential housing 48 is mounted through ball bearings 49 for rotation relatively to brackets 50 secured at 51 to form an integral part of the main frame 10. Differential housing 48 carries a pinion shaft 52 on which is rotatably mounted the drive pinion 53 of a differential unit contained within the differential housing 48. Drive pinion 53 is in driving engagement with opposed gears 54 and 55 splined to the shafts 39. It is of course obvious, that as the traction motor rotates the differential housing 48 through the chain 45 and sprocket 46, it drives the drive shafts 39 differentially through the pinion 53 and the gears 54, 55. Obviously, this differential movement of the drive shafts 39 is then transmitted to the traction wheels 35 through the chains 43.

In order to brake the traction wheels effectively, reliance is had on a brake applied to the differential housing 48 rather than the motor or the traction wheels. Further, this brake is preferably controlled by the swinging movement of the lever steering handle 14. Thus, steering handle 14 is equipped with a rearward extension 56 best seen in Fig. 1, and formed on this extension is a ball 57. Ball 57 operates in the steering axis of the steering head so that in all positions of that steering head it will always overlie the end of a lever 58. Lever 58 is pivoted at 59 to the main frame 10 for pivotal movement by the ball 57, and is pivotally connected at 60 to a rod 61, the rod 61 being in turn pivoted at 62 to a link 63. Link 63 is in turn pivoted at 64 on a bracket 65 extending upwardly from the bracket 50 and is keyed to a link 66. Link 66 is in turn pivoted to a connector 67 that operates links 68 pivoted to the ends of the opposed brake shoes 69. Springs 70 tend to hold the brake shoes out of braking position, but when the lever handle 14 is moved to its position of Fig. 1, it operates through the linkage described to apply the brake shoes against the force of the springs 70. The brake shoes are applied to a braking surface 48a of the differential housing and act to brake the differential housing and therefore the traction wheels 35 whenever the lever handle is moved to its upright position of Fig. 1. In operating the truck, the operator will move the lever handle 14 downwardly to release the brake, and then will close the circuit of the traction motor in one direction or the other through the switch buttons at 16. The feature of this part of my invention is the application of brake shoes directly to the differential housing and is of considerable importance. The actual type of brake actuator I here show is of no particular merit however and is not claimed.

Referring now more particularly to Figs. 1, 2, and 5, a hydraulic tilt ram is designated by reference numeral 71, it being this ram that is equipped with the piston 31 that is connected at 29, 30 to the side bars 26 of the traction unit frame. Hydraulic ram 71 is itself pivoted at 72 to the main frame of the truck. Thus, when fluid is admitted to the ram 71 by operation of the tilt motor and its pump, the ram piston 31 will move downwardly from its position of Fig. 1 to its position of Fig. 2. At the same time, the entire traction unit will be rotated about the axis of the drive shafts 39 relatively to the main frame 10. This will naturally effect the upward tilting movement of the main frame 10 to its position of Fig. 2 and will move the primary uprights 20, the secondary uprights 21, load carriage 22, and the forks 23 into position to tilt the load carried by the forks 23. The truck may now be moved wherever desired by operation of the traction motor, and the load will be transported efficiently and safely.

It is thus seen that through the utilization of a novel form of traction unit in a truck of the class described, I make it possible to transmit tractive force most efficiently and in that relation to the load that is highly desirable. It will also be recognized that I make it possible through utilization of my novel traction unit and its novel mounting to tilt the load without requiring a complicated tilting unit or expensive bearings for the entire upright and carriage assembly.

When it is desired to lower the main frame 10 from its position of Fig. 2 to its position of Fig. 1, it is merely necessary to move the lever 18 and through the valve mechanism 19 allow a flow of fluid from the ram 71 so that the piston 31 will return to its position of Fig. 1, whereupon the original relationship of the traction unit and the main frame will be restored. I believe that the rather considerable contribution of my invention will now be understood by those skilled in the art.

I now claim:

1. In a truck of the class described, a main frame, a vertical upright at the rear end of said main frame, a load carriage movable vertically on said vertical upright, a traction assembly, means pivotally mounting said traction assembly on said main frame, a pair of traction wheels on said traction assembly positioned substantially at the rear end of said main frame, and power means for moving said traction assembly on said mounting means relatively to said main frame whereby to lift and lower the rear end of said main frame relatively to said traction wheels.

2. In a truck of the class described, a main frame, a vertical upright at the rear end of said main frame, a load carriage movable vertically on said vertical upright, a traction assembly, means pivotally mounting said traction assembly on said main frame, a pair of traction wheels on said traction assembly positioned substantially at the rear end of said main frame, and a hydraulic ram extending between said main frame and said traction assembly for moving said traction assembly on said mounting means relatively to said main frame whereby to lift and lower the rear end of said main frame relatively to said traction wheels.

3. In a truck of the class described, a main frame, a vertical upright at the rear end of said main frame, a load carriage movable vertically on said vertical upright, a traction assembly, means pivotally mounting said traction assembly on said main frame, a pair of traction wheels on said traction assembly positioned substantially at the rear end of said main frame, a pair of power shafts rotatable in the pivot axis of said traction assembly, means whereby each of said power shafts drives one of said traction wheels, and power means for moving said traction assembly on said mounting means relatively to said main frame whereby to lift and lower the rear end of said main frame relatively to said traction wheels.

4. In a truck of the class described, a main frame, a vertical upright at the rear end of said main frame, a load carriage movable vertically on said vertical upright, a traction assembly, means pivotally mounting said traction assembly on said main frame, a pair of traction wheels on said traction assembly positioned substantially at the rear end of said main frame, a pair of power shafts rotatable in the pivot axis of said traction assembly, power means for driving said power shafts through a differential, means whereby each of said power shafts drives one of said traction wheels, and power means for moving said traction assembly on said mounting means relatively to said main frame whereby to lift and lower the rear end of said main frame relatively to said traction wheels.

5. In a truck of the class described, a main frame, a vertical upright at the rear end of said main frame, a load carriage movable vertically on said vertical upright, a traction assembly, means pivotally mounting said traction assembly on said main frame, a pair of traction wheels on said traction assembly positioned substantially at the rear end of said main frame, a pair of power shafts rotatable in the pivot axis of said traction assembly, a sprocket on each of said power shafts, a sprocket on each of said traction wheels in alignment with one of said shaft sprockets, a chain extending over each pair of aligned sprockets whereby said power shafts drive said traction wheels, and power means for moving said traction assembly on said mounting means relatively to said main frame whereby to lift and lower the rear end of said main frame relatively to said traction wheels.

6. In a truck of the class described, a main frame, a vertical upright at the rear end of said main frame, a load carriage movable vertically on said vertical upright, a traction assembly, means pivotally mounting said traction assembly on said main frame, a pair of traction wheels on said traction assembly positioned substantially at the rear end of said main frame, a pair of power shafts rotatable in the pivot axis of said traction assembly, a differential, power means driving said power shafts through said differential, a sprocket on each of said power shafts, a sprocket on each of said wheels in alignment with one of said shaft sprockets, a chain extending over each pair of aligned sprockets whereby said power shafts drive said traction wheels, and power means for moving said traction assembly on said mounting means relatively to said main frame whereby to lift and lower the rear end of said main frame relatively to said traction wheels.

7. In a truck of the class described, a main frame, a vertical upright at the rear end of said main frame, a load carriage movable vertically on said vertical upright, a traction frame, a traction wheel at each longitudinal side of the frame, means pivoting said traction frame on said main frame with said traction wheels positioned substantially at the rear end of said main frame, a pair of power shafts rotatable in the pivot axis of said traction frame, power means for driving said power shafts through a differential, means whereby each of said power shafts drives one of said traction wheels, and power means for moving said traction frame on said mounting means relatively to said main frame whereby to lift and lower the rear end of said main frame relatively to said traction wheels.

8. In a truck of the class described, a main frame, a vertical upright at the rear end of said main frame, a load carriage movable vertically on said vertical upright, a traction frame, a traction wheel at each longitudinal side of the frame, means pivoting said traction frame on said main frame with said traction wheels positioned substantially at the rear end of said main frame, a pair of power shafts rotatable in the pivot axis of said traction assembly, a sprocket on each of said power shafts, a sprocket on each of said wheels in alignment with one of said shaft sprockets, a chain extending over each pair of aligned sprockets whereby said power shafts drive said traction wheels, and power means for moving said traction assembly on said mounting means relatively to said main frame whereby to lift and lower the rear end of said main frame relatively to said traction wheels.

HERBERT J. FRAMHEIN.

REFERENCES CITED

The following references are of record in the file of this patent:

UNITED STATES PATENTS

| Number | Name | Date |
|---|---|---|
| 696,704 | Allen | Apr. 1, 1902 |
| 700,950 | Krebs | May 27, 1902 |
| 920,142 | Huff | May 4, 1909 |
| 922,005 | Lewis et al. | May 18, 1909 |
| 958,928 | Kent | May 24, 1910 |
| 1,232,420 | Berger | July 3, 1917 |
| 1,443,355 | French | Jan. 30, 1923 |
| 1,446,913 | Lewis | Feb. 27, 1923 |
| 1,451,194 | Adams | Apr. 10, 1923 |
| 1,466,524 | Folland et al. | Aug. 28, 1923 |
| 1,887,134 | Johancen et al. | Nov. 8, 1932 |
| 2,169,440 | Weiss | Aug. 15, 1939 |
| 2,262,404 | Pavliska | Nov. 11, 1941 |
| 2,307,966 | Sloane | Jan. 12, 1943 |